United States Patent Office 3,457,714
Patented July 29, 1969

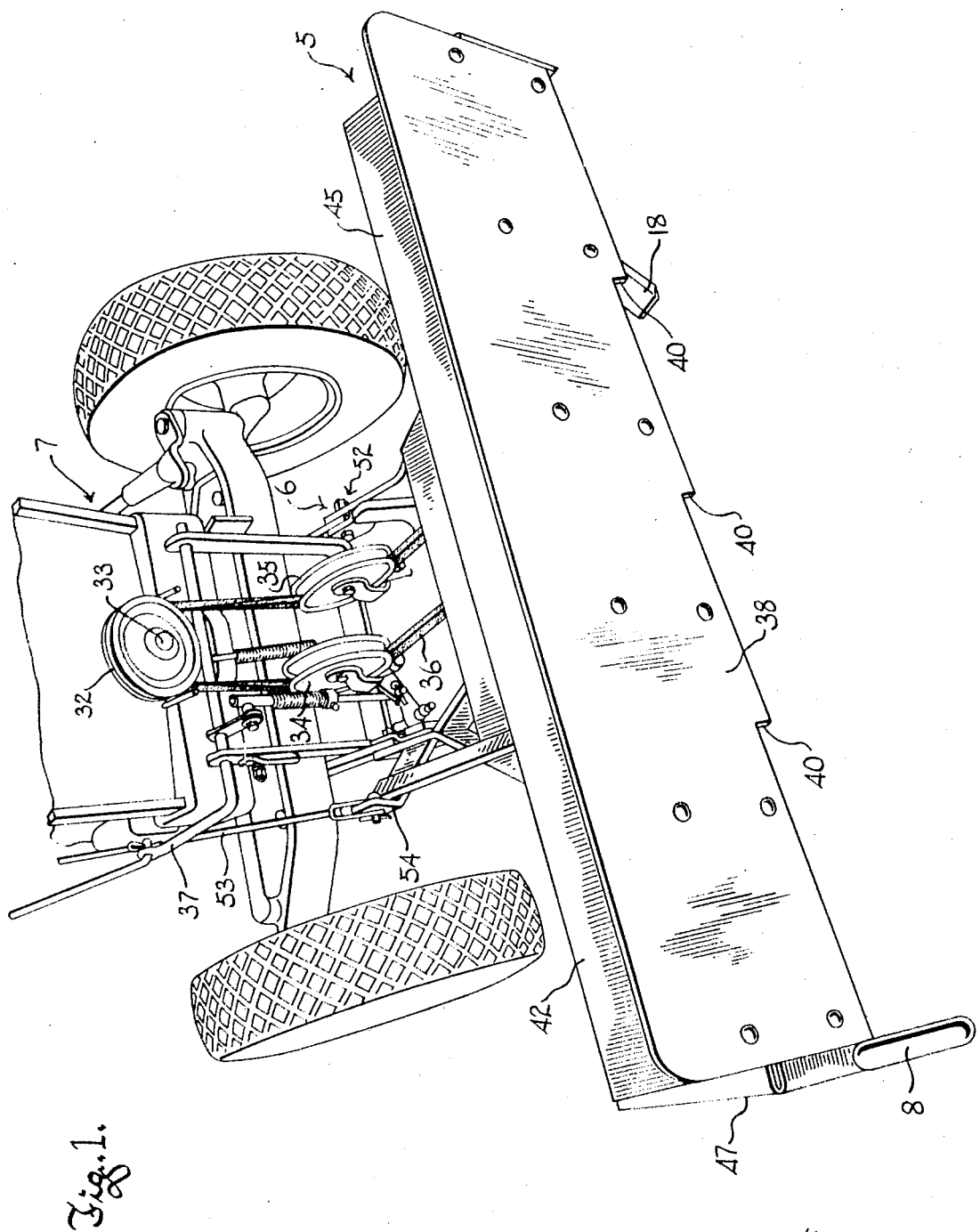

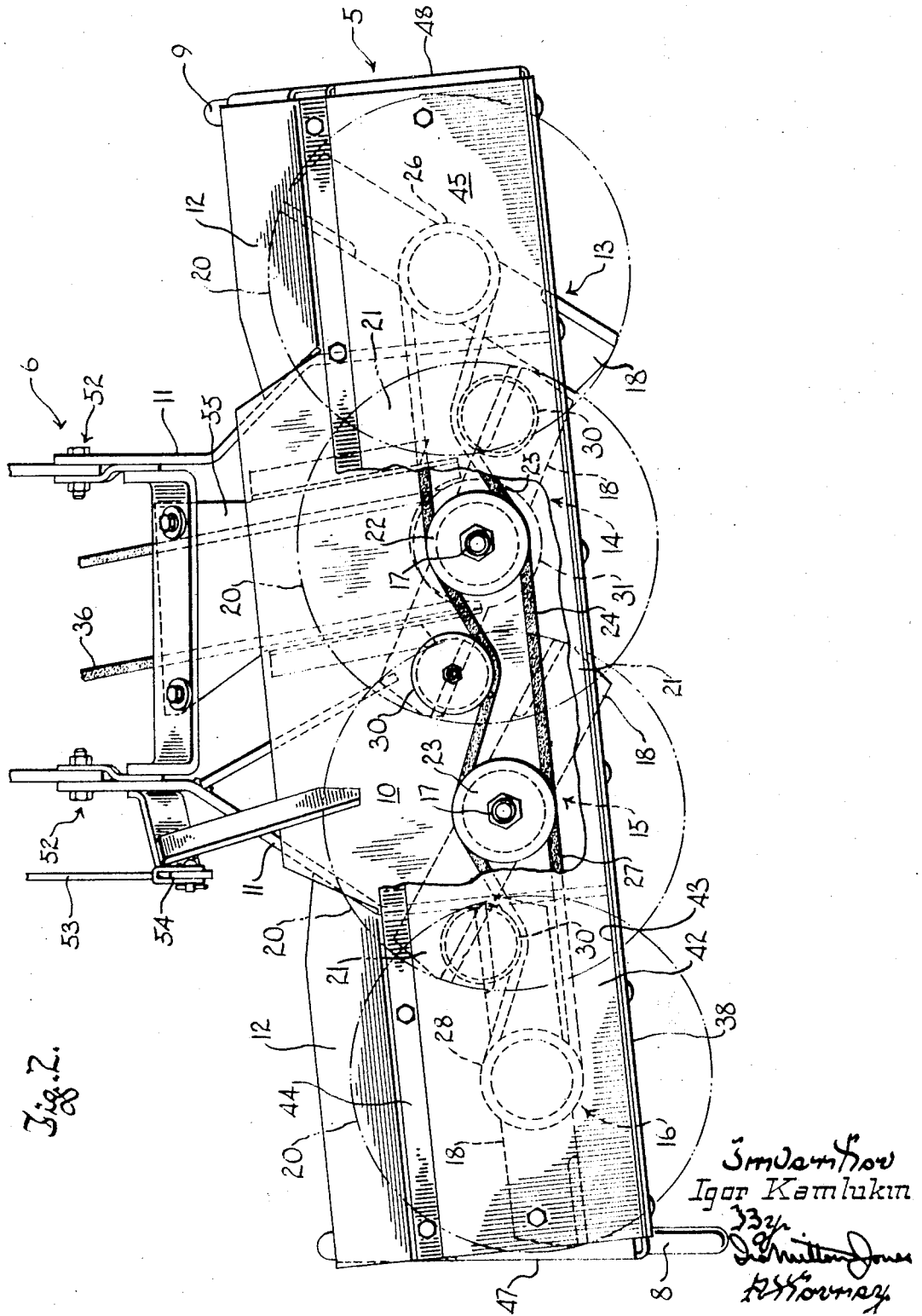

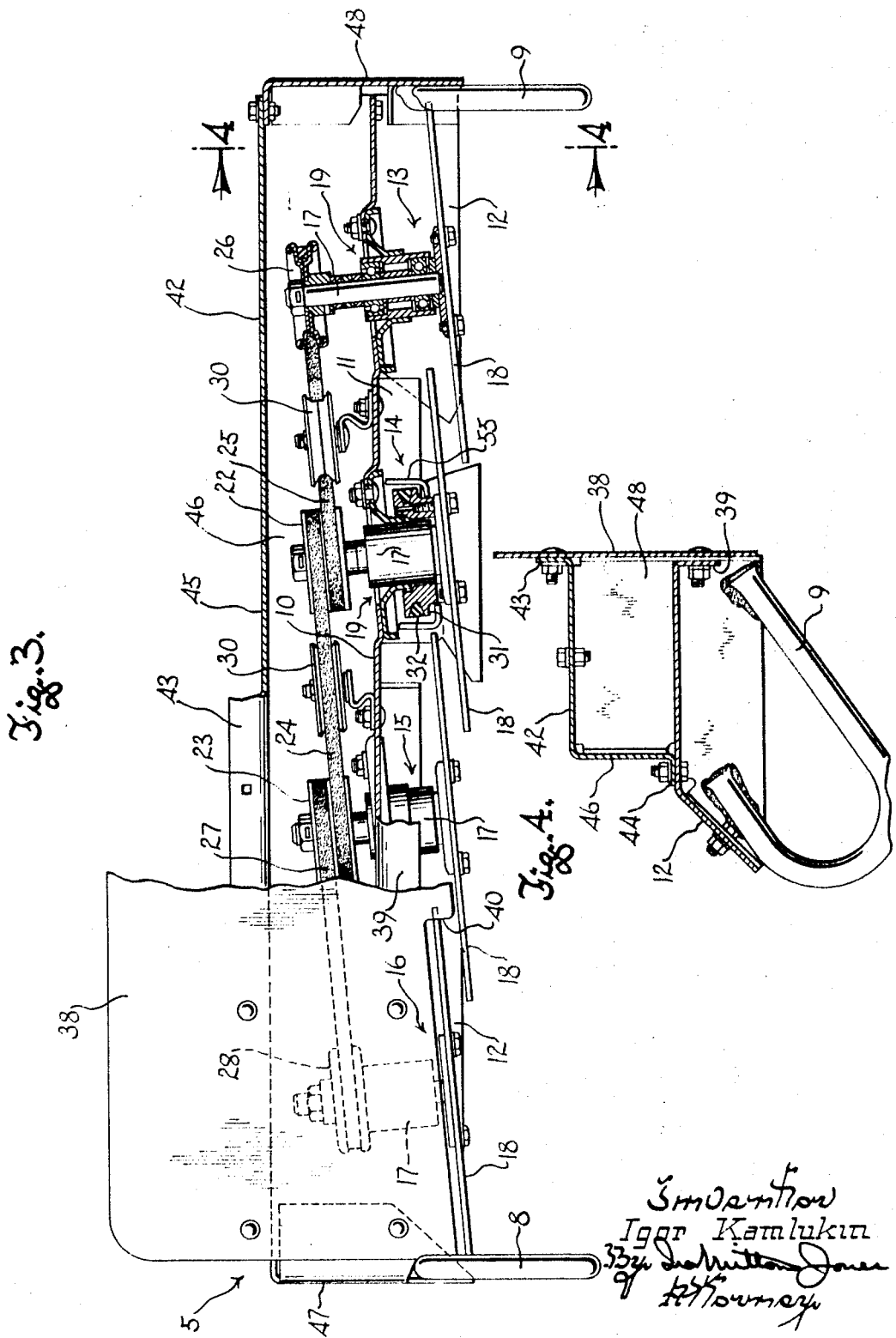

3,457,714
MOWING APPARATUS WITH ROTARY CUTTERS
Igor Kamlukin, Milwaukee, Wis., assignor to Simplicity Manufacturing Company, Inc., Port Washington, Wis., a corporation of Wisconsin
Filed Sept. 14, 1966, Ser. No. 579,433
Int. Cl. A01d 35/26, 49/00
U.S. Cl. 56—503                                                 8 Claims

ABSTRACT OF THE DISCLOSURE

Rotary power driven cutters with radial chopping blades are mounted on horizontal supporting structure with their axes in a row transverse to a swath to be cut and so spaced that orbits of adjacent cutter blades overlap in a zone intermediate their centers. The cutter axes are upright relative to the direction of mower motion but are inclined in one transverse direction so that the blade orbits are in different but parallel planes. The blades are below the supporting structure, drive means for the cutters above it.

---

This invention relates to mowing apparatus, and has more particular reference to improvements in front mounted tractor driven rotary mower accessories which are intended primarily, though not exclusively, for cutting weeds.

Weed mowing apparatus of this type is adapted to cut a swath of a width determined by the number of rotary cutters with which the apparatus is provided. These cutters are arranged in a row transverse to the path of travel of the tractor, and each comprises a spindle journaled for rotation on an upright axis, and a substantially flat cutter blade extending across and medially fixed to the lower end of the spindle. All of the spindles are driven from the power source of the tractor, usually an internal combustion engine.

Heretofore, complicated and costly drive means had to be employed to effect rotation of the cutters. This was necessary because the cutter blades were conventionally constrained to rotate in orbits lying in a common plane and having portions coextensive with one another at zones midway between their centers. For this reason, each blade had to be driven in timed relation to an adjacent blade, and with the blades in such angular relation as to avoid collision of the blades.

In contrast, it is a purpose of this invention to provide a rotary mowing apparatus of the character described wherein an improved orientation of cutter blades arranged in a substantially straight row enables them to be rotated by exceptionally simple drive means without regard to any particular timing and angular relation between the blades of adjacent cutters.

This objective is achieved in a mower featuring rotary cutters that are so oriented that the blades of adjacent cutters travel in separate but parallel orbits which are in spaced but overlapping relation to one another at a zone midway between their centers.

This obviates the need for maintaining a predetermined angular relationship between the blades of adjacent cutters and it has the further advantage of permitting all the cutters to be driven in the same direction through simple and inexpensive transmission means comprised of belts or the like connected between the spindles of adjacent cutters, without danger of the blades colliding.

One particularly successful mower of this invention is provided with four rotary cutters arranged in a row transversely of the direction in which the mower is to be advanced along the ground during mowing; and the cutters are constrained to rotate on parallel upright axes all canted at the same small angle in the same transverse direction, and with their blades traveling in overlapping orbits which have their centers on a common horizontal plane, but which orbits lie in different planes inclined at the same angle to said horizontal plane.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention, constructed according to the best mode so far devised for the practial application of the principles thereof, and in which:

FIGURE 1 is a perspective view of the front portion of a tractor having a rotary mower of this invention connected thereto;

FIGURE 2 is a plan view of the mower;

FIGURE 3 is a front view of the mower with its blade guard partly broken away; and FIGURE 4 is a cross sectional view taken on the line 4—4 in FIGURE 3.

Referring now to the accompanying drawings, the numeral 5 generally designates the elongated substantially horizontal supporting structure of the rotary mowing apparatus of this invention. A hitch mechanism 6 secured to the supporting structure at its rear provides for attachment of the mower to the front of a tractor 7 so that the mower can be pushed ahead of the tractor with its supporting structure horizontal and extending transversely to the path along which the tractor travels. Runners 8 and 9 carried by the supporting structure at its opposite ends can engage the ground to space the mower a minimum cutting distance above ground level.

The supporting structure 5 provides an elongated boxlike housing which is comprised of several component members. The main one of these components is a rigid substantially flat deck member 10 which extends the full length of the housing. Arms 11 on the hitch mechanism 6 extend forwardly and under the rear of the deck, to which they are rigidly secured as by welding. At opposite sides of the arms 11, the deck is bent downwardly and rearwardly as at 12 to provide deflectors of substantial length on the rear of the housing structure.

The rotary cutters are carried by the deck and arranged in a row lengthwise of the deck and transversely to the path of travel of the tractor. In the present case, there are four rotary cutters 13, 14, 15 and 16 on the deck, each comprising a spindle 17 and a substantially flat blade 18 medially fixed to the lower end of the spindle. Bearing means 19 carried by the deck, one for each cutter, rotatably receive the spindles of the cutters and mount the latter on the deck for rotation about upright axes which are spaced apart equal distances lengthwise of the deck, and with the upper end portions of the spindles projecting upwardly beyond the top of the deck and their blades 18 disposed below the deck. The spacing of the spindles is somewhat less than the length of the blades 18 so that the outer end portions of the blades on adjacent cutters travel through zones which are coextensive.

It is a feature of this invention, however, that the bearing means 19 for the cutters support the latter for rotation about parallel axes which are all inclined downwardly and to the right (as seen in FIGURE 3) at the same substantially small angle out of normal with respect to the deck. By this inclined mounting of the cutters, their blades 18 are constrained to travel in different but parallel orbits, indicated at 20, which orbits lie in planes that are spaced apart a small distance and have their centers on a common plane parallel to the deck. It will thus be appreciated that the inclined blade orbits of adjacent cutters will overlap at a zone 21 medially between their centers. As a result, there is no possibility of the blades of adjacent cutters colliding with one another during rotation of the cutters.

For this reason also, there is no need for maintaining the blades in any predetermined angular relationship, or to resort to costly drive mechanism for rotating adjacent cutters in opposite directions, as was sometimes necessary in the past. All of the cutters can be rotated in the same direction, as by simple and inexpensive belt drives such as seen best in FIGURE 3. As therein shown, double groove V pulleys 22 and 23 are affixed to the upper end portions of the spindles of the two center cutters 14 and 15, respectively.

The pulleys 22 and 23 are arranged so that a V belt 24 engaged in the upper groove of pulley 22 and the lower groove of pulley 23 can serve to drivingly connect the cutters 14 and 15 for rotation in the same direction. Similarly, a V belt 25 engaged in the lower groove of pulley 22 and trained over a single groove pulley 26 on the upper end portion of the spindle 17 of the cutter 13 drivingly connects the latter with the cutter 14; while a V belt 27 engaged in the upper groove of pulley 23 and trained over a single groove pulley 28 on the upper end portion of the spindle of the cutter 16 establishes a driving connection between the cutters 15 and 16. As stated, all of the cutters are thus constrained to rotate in the same direction.

Idler pulleys 30, one for each belt, are mounted on the top of the deck 10 for engagement with one stretch of their associated belts to maintain them in driving engagement with their pulleys.

Driving torque is transmitted to a V type input pulley 31 on the spindle of the cutter 14 from a V pulley 32 on a horizontal power take off shaft 33 on the tractor, which shaft can be the forward end of the crankshaft of the engine providing the power source for the tractor.

A V belt 36 trained over the pulleys 31 and 32, and having its opposite stretches maintained taut by idler pulleys 34 and 35 carried by the hitch mechanism 6, cooperates with the spindle drive belts 24–25–27 to drive the cutters from the engine. The idler pulley 34 is preferably mounted for motion toward and from an operative belt tightening position so as to serve as a clutch pulley by which the drive to the cutters can be established or disrupted at will. It is shown in an inoperative position in FIGURE 1, from which it can be moved downwardly to tighten the belt 36 in consequence of forward swinging of a manually controlled lever 37 by the operator of the tractor.

The housing provided by the supporting structure also comprises an upright front plate 38 which extends from one end of the deck to the other thereof and is bolted to a depending flange 39 on the forward edge of the deck. The front plate projects downwardly a distance below the deck to a level partway below the orbits in which the cutter blades 18 travel, and its lower edge is notched as at 40, to allow the end portions of the blades to pass forwardly of the plane of the front plate as the cutters rotate.

The housing also includes a cover member 42 having flanged portions bolted to the front plate and to a rear portion of the deck as at 43 and 44, respectively. The cover member is angle shaped to provide a top wall 45 which extends rearwardly from the front plate and over the upper portions of the cutter spindles and their drive belts, in parallel relation to the deck, and an upright rear wall 46 which is parallel to the front plate and extends downwardly from the top wall 45, behind the spindle drive belts, to the deck 10 at a location forwardly adjacent to the upper portions of its angled deflectors 12.

End walls 47 and 48 close the housing at its opposite ends. The lower edges of the end walls are substantially parallel to the deck, but spaced a distance therebeneath and at a level close to the low points of the blade orbits. The end walls, of course, extend upwardly as far as the top wall of the cover 42 and rearwardly to the rear wall 46 thereof and to the deflectors 12 on the rear of the deck. The front plate 43, however, preferably extends a substantial distance above the top wall 45 of the cover, as shown best in FIGURE 4.

The runners 8 and 9 are secured to the end walls 47 and 48, respectively, and are adapted for engagement with the ground to determine the minimum height of cut. From its lowermost position riding on the runners, the supporting structure can be tilted upwardly to various cutting positions about transversely coaxial hinged joints 52 between the forwardly extending hitch arms 11 and the remainder of the hitch mechanism, and it can be latched in the elevated position desired by control means on the tractor. This control means includes a pull cable 53 which connects with an upstanding bar 54, on one of the arms 11, at a location on the bar a distance above the hinged joints 52.

A guard, not shown, is ordinarily secured over the tractor mounted portion of the hitch mechanism to cover the engine pulley 32, the idler pulleys 34 and 35, and the belt 36 trained thereover. Similarly, a guard 55 is provided to cover the stretch of the belt 33 that extends under the deck 10. This last named guard is secured, at least in part, to the deck, at its underside; while the first mentioned guard is mounted on the hitch mechanism 6.

As viewed in FIGURE 2, all of the cutters are driven in the counterclockwise direction during mowing. As a result, the end portions of the blades traveling through the forward portions of their orbits move toward the right as they approach the highest level of their orbits. Because of the overlapping relation of the blade orbits, this tends to promote transfer of clippings from each blade to the next adjacent blade to its right, all along the transverse row of cutters, so that the clippings discharge toward the right hand end of the supporting structure, adjacent to the end wall 48 thereof.

It is also noteworthy that the supporting structure is held by the hitch mechanism 6 at a slight angle out of normal with respect to the path of travel of the tractor. This angle is such that the right hand or discharge end of the mower trails its left hand end, thereby further promoting the flow of clippings from one cutter to the next, toward the right hand end of the mower.

From the foregoing description, together with the accompanying drawings, it will be apparent to those skilled in the art that this invention provides a multi-blade rotary mower which features an unusual degree of simplicity and mowing efficiency.

What is claimed as my invention is:

1. Mowing apparatus movable in one direction to cut a substantially wide swath, of the type comprising a plurality of power driven rotary cutters, each having radial blades for chopping independently of the other cutters, said cutters being arranged in a row transverse to said direction, said mowing apparatus being characterized by:
   (A) a transversely extending substantially horizontal cutter supporting structure;
   (B) means on the supporting structure mounting the cutters therebeneath for rotation on parallel generally upright axes that are
      (1) inclined transversely to the direction of motion of the apparatus and
      (2) in such relation to one another that the blades on adjacent cutters rotate in orbits which have their centers at a common level and which are parallel and spaced apart but overlap one another at a zone medially between the axes of rotation of said adjacent cutters; and (C) drive means for each cutter above the horizontal cutter supporting structure.

2. Mowing apparatus for cutting a substantially wide swath comprising a plurality of power driven rotary cutters, each having a spindle that carries radical blades for chopping independently of the other cutters, said mowing apparatus being characterized by:

(A) a tranversely elongated substantially horizontal cutter supporting structure;

(B) bearing means on the supporting structure in which the spindles of the cutters are journaled for rotation with the centers of their blade orbits on the same level and on axes that are (1) spaced apart lengthwise of the supporting structure by distances such that the orbits of the blades of adjacent cutters overlap at a zone medially between their centers, (2) said axis being substantially upright in the direction transverse to the length of the supporting structure but (3) inclined in one direction lengthwise of the supporting structure so that the orbits of all of the blades lie in different planes; and (C) drive means for each cutter above said bearing means.

3. The mowing apparatus of claim 2, further characterized by drive means connecting the spindles of the cutters for rotation in a common direction and in unison.

4. The mowing apparatus of claim 3, wherein said drive means comprises pulleys on the cutter spindles, and belts trained around the pulleys on adjacent spindles to establish driving connections therebetween.

5. The moving apparatus of claim 3, further characterized by:

(A) said supporting structure comprising an elongated deck having said bearing means thereon;

(B) the cutter blades being disposed below said deck and the spindles having portions projecting upwardly above the deck;

(C) and said drive means connecting said upwardly projecting portions of the spindles.

6. The mowing apparatus of claim 5, further characterized by an input pulley on one of said spindles, beneath the deck, with which a drive belt is engageable.

7. The mowing apparatus of claim 5, further characterized by a protective cover over the upwardly projecting portions of the spindles and the drive means connecting the same, said cover being a part of the supporting structure.

8. The mowing apparatus of claim 2, further characterized by a plate on the supporting structure, extending lengthwise along one side thereof and having cutout portions along its lower edge to closely accommodate end portions of the blades during cutting.

References Cited

UNITED STATES PATENTS

| | | | |
|---|---|---|---|
| 1,465,279 | 8/1923 | Montague | 56—295 |
| 1,710,749 | 4/1929 | Svendsgaard | 56—25.4 |
| 2,680,342 | 6/1954 | Montague | 56—255 |
| 3,017,732 | 1/1962 | Keyes | 56—25.4 |
| 3,053,033 | 9/1962 | Maguire | 56—25.4 |
| 3,080,696 | 3/1963 | Wood | 56—25.4 |
| 3,115,741 | 12/1963 | Robinson | 56—503 |

RUSSELL R. KINSEY, Primary Examiner

U.S. Cl. X.R.

55—25.4, 255